United States Patent [19]
Crawley

[11] 3,991,841
[45] Nov. 16, 1976

[54] WEIGHING DEVICE

[75] Inventor: David F. C. Crawley, Keyworth, England

[73] Assignee: The Boots Company Limited, Nottingham, England

[22] Filed: June 18, 1975

[21] Appl. No.: 587,916

[30] Foreign Application Priority Data
June 25, 1974 United Kingdom............... 28090/74

[52] U.S. Cl................................ 177/225; 177/184; 177/210; 177/229; 267/161
[51] Int. Cl.² ........................................ G01G 3/00
[58] Field of Search .......... 177/210, 225, 229, 231, 177/255, 168, 264, 184; 73/141 A; 267/161, 182

[56] References Cited
UNITED STATES PATENTS
2,508,975  5/1950  Sundby ........................ 177/229 X
3,142,349  7/1964  Blodgett ....................... 177/210 X Primary Examiner—Joseph W. Hartary
Attorney, Agent, or Firm—Gordon W. Hueschen

[57] ABSTRACT

A device suitable for weighing tablets, during manufacture, comprises a ring whose deflection is proportioned to a normal stress applied to it. The deflection may be measured by a suitable transducer, such as a linear differential transformer. Sideways flexing of the ring is prevented by cantilevers connected to the ring perpendicular to its plane.

10 Claims, 2 Drawing Figures

U.S. Patent
Nov. 16, 1976
3,991,841
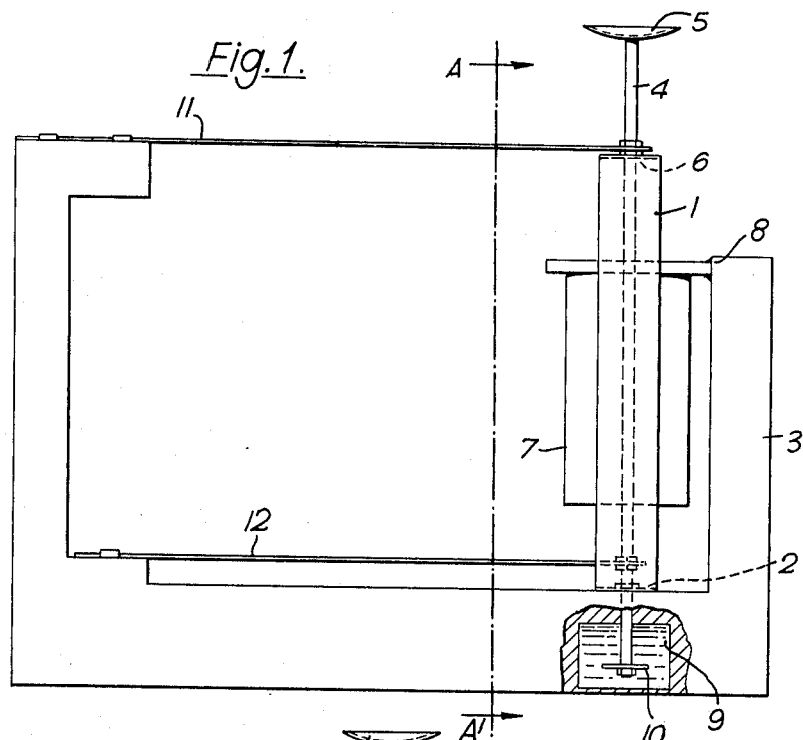
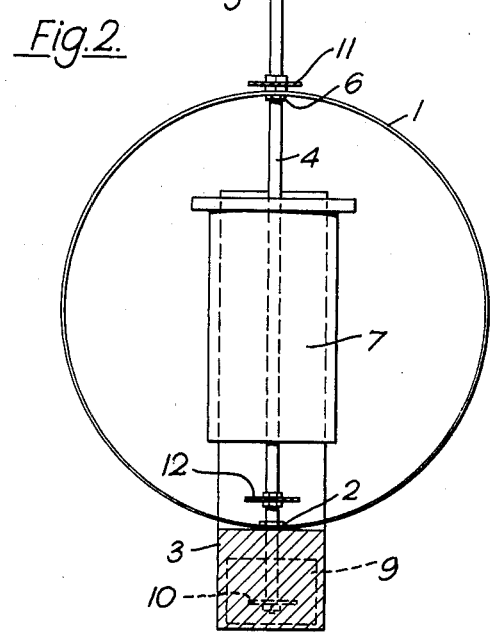

WEIGHING DEVICE

This invention relates to a weighing device and in particular to a device for weighing light objects such as pharmaceutical tablets.

During the production of pharmaceutical tablets manufactured, for example, by powder compression tableting machines it is necessary to monitor the weight of random tablets being produced. Usually this is achieved using a balance but such measurements take a long time and consequently there is a long delay before the machine is stopped if samples are found to be outside the prescribed weight parameters.

According to the present invention there is provided a weighing device which comprises a receptacle for the object to be weighed which is connected to the circumference of a ring formed from a band of thin flexible material, the plane of the ring being vertical, whereby a force applied to the receptacle causes compression of the ring; at least one cantilever substantially perpendicular to the plane of the ring, whose one end is fixed and whose other end is connected to the ring to impede sideways flexing of the ring, the cantilever's length and moment of inertia being such that it has substantially no effect on the flexure of the system; and means for measuring the amount of flexing of the ring.

Any suitable means for measuring the flexing of the ring may be used, for example, strain gauges attached to the circumference. However, it is particularly preferred to use a linear differential transformer in which the vertical central ferromagnetic core is connected to the circumference of the ring whereby movement of the ring causes movement of the core which causes a change in the voltage output of the transformer which is related to the movement of the core.

The band is preferably manufactured of steel strip, preferably having a thickness of less than 0.2 mm.

It is preferred that there are two cantilevers, usually one above and one below the ring. These may suitably be of very thin steel strip also preferably having a thickness of less than 0.2 mm.

Preferably at least one cantilever (and if there are two, then usually just the lower one) is pretensioned, e.g. by being bent downwards before being fixed to the ring, whereby the resultant upthrust of the pretensioned cantilever(s) counteracts, at least to a partial extent, the gravity effects of the cantilever(s).

The invention is illustrated in the accompanying drawings in which

FIG. 1 is a side view of the apparatus and

FIG. 2 is a section along line AA'.

Referring to the drawings, a ring consisting of a steel band 1 is fixed at 2 to a metal frame 3. The steel band 1 is of a very thing gauge (approximately 0.06 mm in thickness). A rod 4 at one end of which is a receptacle 5 for an object to be weighed, e.g. a tablet, passes through and is fitted to the band 1 by means of nut 6 and then passes through a linear differential transformer 7.

The transformer is fixed to the frame 3 at 8. Inside the transformer the rod has a cylindrical sleeve of ferromagnetic material so that, as it moves up or down, the output voltage of the transformer varies. The output voltage of the transformer is measured on a digital read out voltmeter (not shown). The rod passes out of the transformer and through a hole in the frame 3 into a vessel 9 containing a viscous liquid, such as a silicone oil. A washer 10 is fitted at the bottom of the rod whereby movement of the rod is damped.

A cantilever 11 of very thin steel strip, has one end fixed to the frame 3 and the other end to the rod 4 and steel band 1 by means of nut 6. A second cantilever 12 of similar material to cantilever 11 also has one end fixed to the frame 3 and the other end to the rod 4. These two cantilevers reduce any tendency of the band 1 to flex sideways. On the other hand since the cantilevers are relatively long but of very low moment of inertia they have little effect on the flexural properties of the steel band 1.

To ensure that the deflection of the ring is linear, as far as possible, in proportion to the stress applied to it, the lower cantilever 12 is pretensioned by being bent downwards before the upper cantilever 11 is fixed to the band 1. In this way, the lower cantilever 12 has an upthrust which counteracts the gravity effects of both cantilevers. The amount the lower cantilever 12 is bent is determined by trial and error.

To weigh an object, e.g. a tablet, the transducer 7 is turned so that there is no voltage output. The tablet is then placed in the receptacle 5. The rod 4 moves down and deflects the ring, the amount of movement of the rod being proportional to the weight of the tablet. The voltage emitted by the transducer is then measured whereby the weight of the tablet can be determined, the voltage/weight calibration have previously been carried out.

The apparatus of the invention can obtain accurate readings very rapidly, usually in less than 2 seconds of objects weighing for example as little as 1 to 400 mg. In this way, for example, a rapid check can be made on the weight of tablets produced by a tableting machine. If desired the signal from the weighing machine can be used so that if the tablets produced fall outside prescribed weight limits the machine is stopped, an alarm is raised, or through a suitable electronic interface, automatic corrective action initiated.

I claim:

1. A weighing device which comprises a frame, a ring formed from a band of thin flexible material, the plane of the ring being vertical, the nadir of the ring being supported on said frame, and the acme of the ring being free to move downwardly as the ring is compressed by the application of a downwardly directed force and upwardly when the force is dissipated; a receptacle for the object to be weighed; said receptacle being connected to the acme of the ring, whereby a force applied to the receptacle, as by the deposit of the object to be weighed in said receptacle, causes compression of the ring; at least one cantilever substantially perpendicular to the plane of the ring, one end of which is fixed to said frame and the other end of which is connected to the acme of the ring in a manner to impede sideways flexing of the ring, the cantilever's length and moment of inertia being such that it has substantially no effect on the flexure of the system; and means for measuring the amount of compression of the ring.

2. A device according to claim 1, in which there is a second cantilever positioned below the first and parallel thereto with one end fixed to said frame and the other end connected to the nadir of said ring by means of a vertical rod.

3. A device according to claim 2 in which at least one cantilever is pretensioned whereby the resultant upthrust counteracts, at least to a partial extent, the gravity effects of the cantilevers.

4. A device according to claim 1 in which the ring is manufactured of steel strip having a thickness of less than 0.2 mm.

5. A device according to claim 1, comprising a vertical rod extending upwardly from said frame through the nadir of the ring and through the acme of the ring to said receptacle, said rod being free to move upward and downward with respect to said frame and nadir of said ring but being affixed to the acme of said ring and to said receptacle, whereby a downwardly directed force applied to said receptacle causes downward vertical movement of said rod and in turn compression of the ring and removal of said force allows said ring and said rod to assume the normal position.

6. A device according to claim 5, in which the means for measuring the compression of the ring comprises a linear differential transformer in which the vertical central ferromagnetic core surrounds said rod and is affixed thereto and thereby is connected to the acme of the ring whereby movement of the ring causes movement of the core which causes a change in the voltage output of the transformer which is related to the movement of the core.

7. A device according to claim 5, in which the lowermost end of said rod is attached to a dampening device.

8. A device according to claim 7, in which there is a second cantilever spaced below and parallel to the first with one end affixed to said frame and the other end affixed to said rod at a point above the nadir of the ring sufficiently so as not to interfere with downward movement of the rod.

9. A device according to claim 8, in which the second cantilever is pretensioned to give an upthrust of sufficient magnitude at least partially to compensate the gravity effects of both cantilevers.

10. A device according to claim 9, in which the means for measuring the amount of compression of the ring comprises a linear differential transformer in which the vertical central ferromagnetic core surrounds said rod and is affixed thereto and thereby is connected to the acme of the ring whereby movement of the ring causes movement of the core which causes a change in the voltage output of the transformer which is related to the movement of the core.

* * * * *